April 26, 1949. L. S. MACDONALD 2,468,216
MAGAZINE ROCKET LAUNCHER
Filed Jan. 17, 1946 10 Sheets-Sheet 4

Inventor
Lester S. Macdonald
By his Attorney

Inventor
Lester S. Macdonald
By his Attorney

April 26, 1949.  L. S. MACDONALD  2,468,216
MAGAZINE ROCKET LAUNCHER

Filed Jan. 17, 1946  10 Sheets-Sheet 6

Fig. 7

Inventor
Lester S. Macdonald
By his Attorney

April 26, 1949.   L. S. MACDONALD   2,468,216
MAGAZINE ROCKET LAUNCHER
Filed Jan. 17, 1946   10 Sheets-Sheet 9

Inventor
Lester S. Macdonald
By his Attorney

Patented Apr. 26, 1949                                         2,468,216

UNITED STATES PATENT OFFICE 2,468,216

MAGAZINE ROCKET LAUNCHER

Lester S. Macdonald, Beverly, Mass., assignor to United Shoe Machinery Corporation, Flemington, N. J., a corporation of New Jersey Application January 17, 1946, Serial No. 641,747

10 Claims. (Cl. 89—1.7)

This invention relates to apparatus for launching projectiles, and is illustrated herein as embodied in an apparatus for launching rockets from airplanes or other suitable carriers.

It is an object of the invention to provide an improved apparatus of the above-mentioned character that is of desirably light, yet rugged, construction, efficient in operation, and by the use of which a plurality of projectiles, such as rockets, may be launched in rapid succession by means controlled from a remote station.

Accordingly, there is provided a rocket launching apparatus comprising a magazine adapted to be mounted in an airplane and to hold a plurality of disposable rocket carrying tubes, a projection tube and an exhaust tube secured at opposite ends of the magazine and extending through openings in the airplane, remotely controlled indexing mechanism for moving the rocket carrying tubes successively from a loading position to a rocket launching position in register with the projection tube and the exhaust tube, and remotely controlled firing means for firing the rockets successively after their carrier tubes have been moved into launching position. It is understood that the apparatus may, if desired, be mounted in the airplane in such a way that the lower or launching end of the magazine will project through an opening in the floor of the airplane, and the projection tube may be mounted entirely outside the airplane, in the manner described in my prior application, Serial No. 597,921, filed June 6, 1945, now Patent No. 2,440,723, patented May 4, 1948.

The apparatus also comprises, in accordance with a feature of the invention, a rocket tube centering mechanism operatively connected to the indexing mechanism and arranged to cooperate therewith to center and hold each rocket carrying tube in its rocket launching position. In the preferred embodiment of the invention illustrated herein, the indexing mechanism includes a star wheel assembly comprising a pair of star wheels, which successively engage the rocket carrying tubes as they reach the bottom of the magazine, and are rotated to locate each tube in rocket launching position and to eject the empty tubes from the magazine. The previously mentioned centering mechanism comprises a pair of centering members that are actuated to swing into and out of operative position, and are provided with tube engaging faces which are complemental to the tube engaging faces of the star wheels. In timed relation to the rotation of the indexing mechanism to move a rocket carrying tube into launching position, the centering members are moved into operative position, in which they cooperate with the star wheels in such manner that the rocket carrying tube will be held in alinement with the projection tube and the exhaust tube to insure correct launching of the rocket. Upon initiation of a new indexing cycle, the centering members are swung out of engagement with the tube whose rocket has been launched, to permit the empty tube to be ejected through the open lower end of the magazine as the star wheels are rotated to move another rocket carrying tube into launching position.

The invention further provides novel means for firing the rockets successively after each rocket carrying tube has been located and centered in rocket launching position. As herein illustrated, each rocket carrying tube is provided on its outer surface with spaced contact bands electrically connected to terminals on the rocket carried by the tube. Mounted on the lower, or launching, end of the magazine is a plate of insulating material to which are secured conductors having contact elements which project through the insulating plate and are arranged to engage the contact bands on the rocket tube as the latter is located and centered in rocket launching position. The conductors are connected in a firing circuit controlled by a firing switch in the pilot's compartment. Upon operation of the firing switch by the pilot, after a rocket carrying tube has been located and centered in launching position, electric current will be caused to pass through the conductors and the contact elements to the contact bands on the rocket tube to fire the rocket.

These and other features of the invention will become apparent from the following description with reference to the accompanying drawings, in which.

Figure 1:
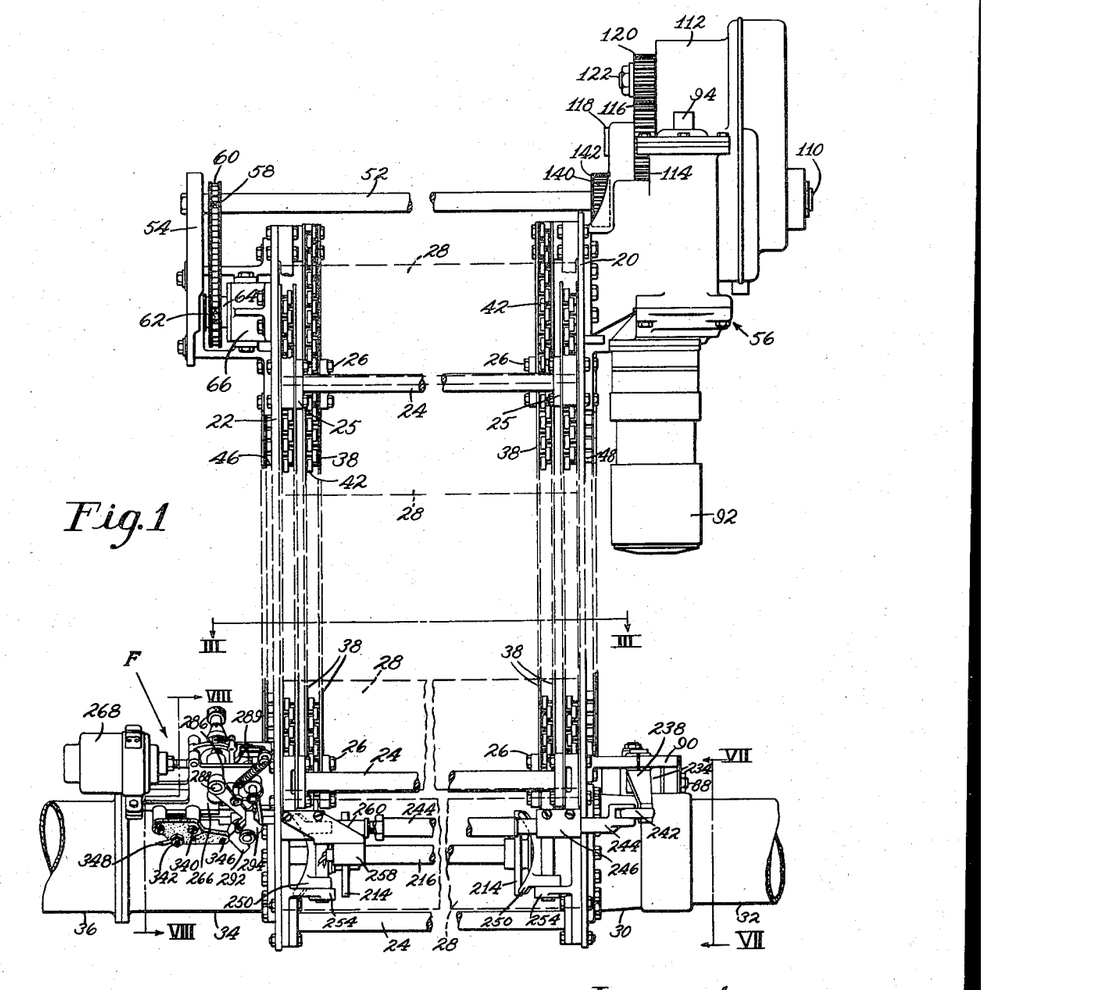
Fig. 1 is a view in side elevation of a rocket launching apparatus embodying the invention, the forward or launching end of the apparatus being shown at the right of this figure.

Referring now to the drawings, the illustrated rocket launching apparatus is constructed in a manner to limit the weight of the apparatus to a minimum, and comprises a magazine the frame of which consists of two side plates 20, 22 (Fig. 1) joined together by a plurality of spaced, parallel rods 24 that are formed with flanges 25 and secured by bolts 26 to the inner surfaces of the side plates. The magazine is adapted to hold a plurality of rockets carried in tubes 28 which are open at both ends and which, in order further to reduce the weight of the apparatus, are preferably made of a light material, such as paper board or a plastic composition. The rocket tubes have an internal diameter such that the rockets are held relatively snugly within the tubes yet with sufficient space between them to permit the rockets to clear the tubes when fired. After the firing of a rocket, its carrier tube is ejected through the open lower end of the magazine and drops to the floor of the airplane. Undamaged tubes may be reused, while damaged ones will be jettisoned.

Figure 3:
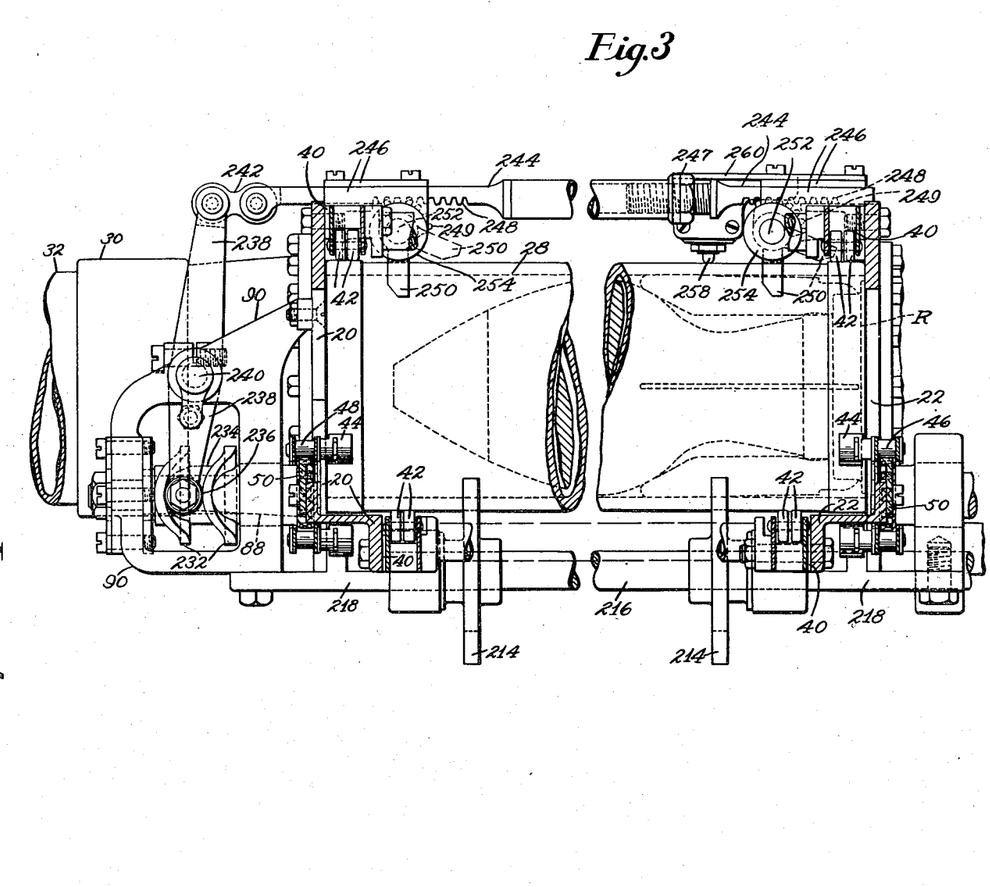
Fig. 3 is a plan view, on line III—III of Figure 1, on an enlarged scale, of the lower portion of the apparatus, illustrating more particularly the centering mechanism, the forward or launching end of the apparatus being shown at the left of this figure.

To the frame member 20 is secured a cylindrical flange 30, to which is riveted a projection tube 32 that is arranged to extend through an opening in the nose, or other suitable portion of the airplane, and through which the rockets are launched. The flange 30 and the projection tube 32 have an internal diameter substantially equal to the internal diameter of a rocket carrying tube, but slightly greater than the external diameter of a rocket, to permit free passage of the rocket. Similarly bolted to the lower end of the frame member 22 is a cylindrical flange 34, to which is riveted an exhaust tube 36 that is arranged to extend through another opening in the airplane and through which are exhausted the gases released by the rockets. To the inner face of each magazine frame member 20, 22 are secured two pairs of spaced uprights 38 which are separated from the frame members by spacer members 40 (Fig. 3). In the spaces between the uprights 38 of each pair are mounted anti-friction rolls 42 (Figs. 1, 7 and 8) which guide the rocket carrying tubes in their downward movement. The rocket carrying tubes are spaced equal distances from one another and supported by blocks 44 carried by sprocket chains 46, 48 which form part of a conveyer mechanism to be described hereinafter. The chains 46, 48 run in engagement with vertical guides 50 (Fig. 3) secured to the outer surfaces of the magazine frame members 20, 22.

The conveyer mechanism for moving the rocket tubes into launching position in register with the projection tube 32 and the exhaust tube 36 comprises a cross shaft 52 (Fig. 1) mounted in bearings in a bracket 54 secured to the upper end of the magazine frame member 22 and in a housing 56 mounted on the upper end of the frame member 20. The shaft 52 is geared to a planetary gear drive mechanism, to be described hereinafter, which is arranged to drive the conveyer mechanism at a low velocity at the beginning and end of an indexing cycle, and at a relatively high velocity during the principal portion of the indexing cycle, thereby insuring smooth operation of the conveyer mechanism to move the rocket tubes successively into launching position without shock. A sprocket 58 (Figs. 1 and 2), mounted on one end of the shaft 52, is connected by a chain 60 to a sprocket 62 on one end of a shaft 64 mounted in bearings in the bracket 54 and in a bearing block 66 secured to the upper end of the magazine frame member 22. The other end of the shaft 64 carries a sprocket 68 which is connected by the chain 46 to a sprocket 70 on one end of a shaft 72 journaled in a bracket 74 (Fig. 8) that is secured to the lower end of the magazine frame member 22. A sprocket 76 (Fig. 2), mounted on the opposite end of the cross shaft 52, is connected by a chain 78 to a sprocket 80 carried by a shaft 82 mounted in bearings in the upper end of the frame member 20 and in the housing 56. A second sprocket 84, mounted on the inner end of the shaft 82, is connected by the chain 48 to a sprocket 86 on the inner end of a shaft 88 which is journaled in a bracket 90 (Figs. 3 and 7) secured to the lower end of the magazine frame member 20.

The conveyer mechanism just described is driven by a reversible electric motor 92 (Figs. 1 and 2) through a transmission comprising a vertical shaft 94 rotatably mounted in bearings in the housing 56. The lower end of the shaft 94 carries a brake 96 constituting part of a multiple disk friction clutch and brake mechanism whose clutch member 98 is carried by the motor shaft 100. The motor runs continuously and, upon engagement of the clutch 98 by operation of a switch on the instrument panel in the pilot's compartment, drives the shaft 94 at a constant speed that is transformed into a variable speed by a planetary gear drive now to be described.

Figure 4:
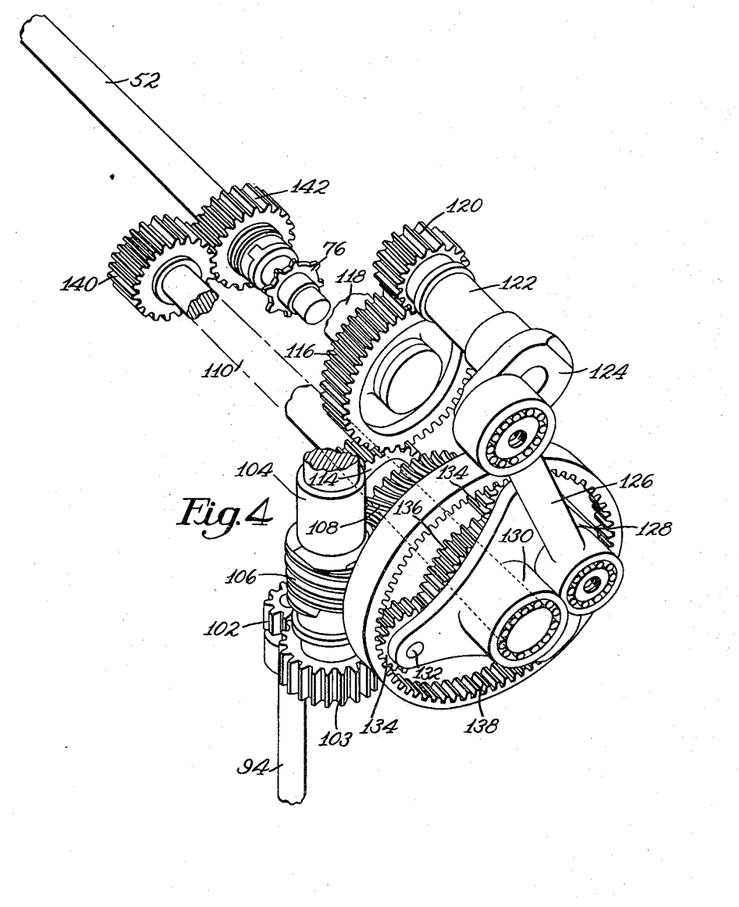
Fig. 4 is a perspective view of a variable speed drive for operating the indexing mechanism.

Fast on the upper end of the shaft 94 is a pinion 102 (Figs. 2 and 4), which meshes with a gear 103 keyed to the lower end of a shaft 104 mounted in a bearing in the housing 56. A worm 106 on the shaft 104 meshes with a worm gear 108 rotatably mounted on the inner end of a shaft 110 mounted in bearings in a housing 112 formed integral with the housing 56. A gear 114 on the shaft 110 meshes with an intermediate gear 116 carried by a stud 118 mounted in the housing 112. The intermediate gear 116 meshes with a gear 120 formed on one end of a crank shaft 122 mounted in a bearing in the housing 112 and having at its opposite end a crank arm 124 which is connected by a rod 126 to a spider 128 having a hub member 130 that is rotatably mounted on the inner end of the shaft 110. The spider 128 carries studs 132 on which are rotatably mounted planetary pinions 134 meshing with a sun gear 136 fast on the shaft 110 and also with a ring gear 138 formed integral with the worm gear 108. Fast on the outer end of the shaft 110 is a gear 140 which meshes with a gear 142 on the right-hand end of the sprocket shaft 52. The shaft 94 rotates the worm shaft 104 at a constant speed which, through the oscillating motion of the spider 128, is transformed into a variable speed, as a result of which the output shaft 110 rotates the sprocket shaft 52 at varying speeds to operate the conveyer mechanism smoothly and with a minimum of shock.

The starting and stopping of the driving mechanism is controlled by a clutch and brake control mechanism which operates to disengage the clutch and apply the brake automatically to bring the driving mechanism to a stop upon completion of an operating cycle to move the rocket tubes a distance substantially equal to the spacing between the centers of two adjacent tubes. This clutch and brake mechanism is actuated by a solenoid 144 (Figs. 2, 5 and 6) that is mounted on the housing 56 and is energized by operation of an indexing switch 146 (Fig. 14) in the pilot's compartment. The solenoid plunger 148 (Figs. 2, 5 and 6) is connected to a tripping latch 150 having a hook 152 arranged to engage a projection 153 of a link 154 pivotally connected by a pin 156 to one arm of a clutch shifting bell-crank lever 158 pivoted on a stud 160 carried by a lug 162 on the housing 56. The bell crank 158 has a fork 164, the ends of which carry blocks 166 which engage in an annular groove 168 of a clutch sleeve 170 mounted on the shaft 94. The opposite end of the link 154 is pivotally connected by a pin 172 to one end of a link 174 the other end of which is pivoted at 176 to the lower, bifurcated portion 178 of one arm of a bell crank 180 pivoted at 182 on a bracket 184 secured to the housing 56. The other arm of the bell crank 180 carries a pin 186 on which is mounted a roll 188 arranged to ride on the periphery of a cam 190 mounted on the outer end of the shaft 82 and provided with a projection 191 and two depressions 192 and 194, in either of which the roll 188 is adapted to engage when the shaft 82 comes to a stop, depending upon the direction of rotation of the motor as will be explained hereinafter, to hold the brake firmly applied at the conclusion of an indexing cycle.

Figure 2:
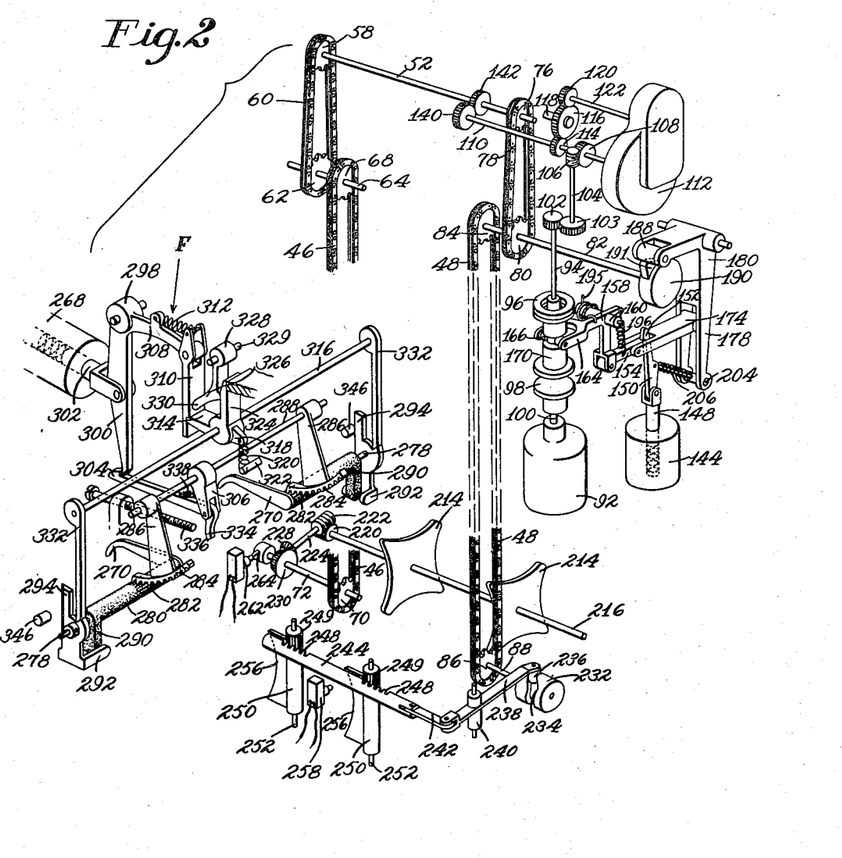
Fig. 2 is a schematic view of the indexing, centering and firing mechanisms with which the apparatus is provided.
Figure 5:
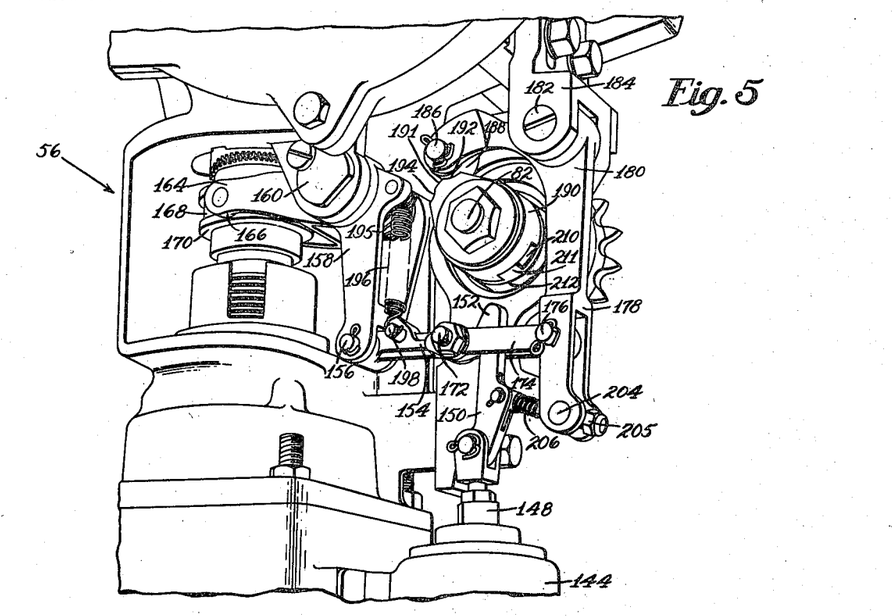
Fig. 5 is a view, on an enlarged scale, of a clutch and brake control mechanism for controlling the starting and stopping of the indexing mechanism, this view showing the control mechanism in brake-applying position.
Figure 6:
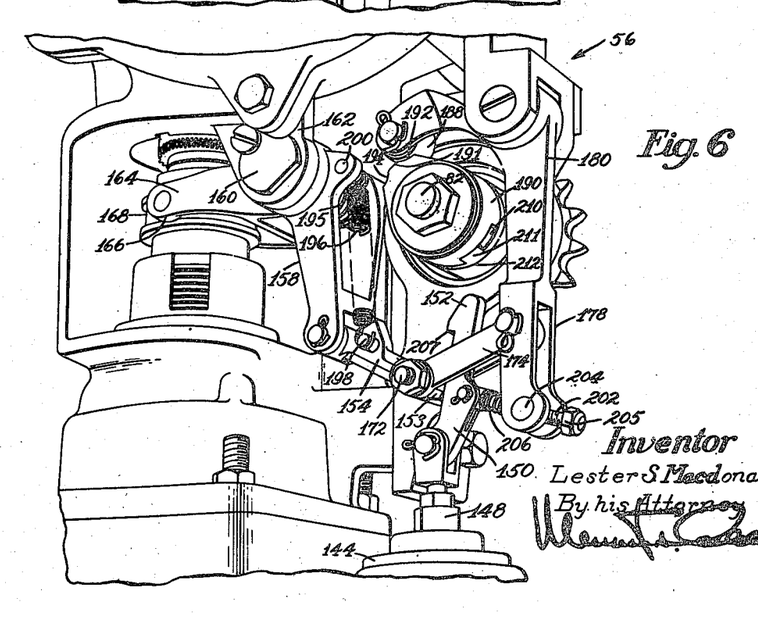
Fig. 6 is a view similar to Fig. 5, with the control mechanism shown in clutch-engaging position.

Referring to Figs. 2, 5 and 6, the clutch and brake control mechanism just described operates as follows: With the power on and the motor running, when the pilot closes the indexing switch, the solenoid 144 is energized and draws the latch 150 down. As the latch is moved down, its hook 152 acts on the projection 153 of the link 154 and trips the link, whereupon the bell crank 158 is actuated by a torsion spring 195 mounted on the pivot stud 160 to swing in a counterclockwise direction, as seen in Fig. 6, to move the sleeve 170 downward so as to release the brake an engage the clutch. Tripping of the link 154 also breaks the toggle formed by the links 154, 174, against the tension of a spring 196 which tends at all times to maintain the toggle in its straightened position, the spring being connected at one end to a pin 198 carried by the link 154 and at its opposite end to a pin 200 carried by the bell crank 158. The toggle being broken, the projection 191 of the cam 190 carried by the sprocket shaft 82 is permitted to move past the cam roll 188 carried by the bell crank 180, the roll thereafter riding in contact with the low portion of the cam during a revolution of the shaft 82. Near the end of a revolution of the shaft 82, the cam roll again engages the projection 191 of the cam and then drops into the depression 192 of the cam as the shaft 82 comes to rest. Engagement of the roll 188 with the projection 191 of the cam causes the bell crank 180 to swing in a clockwise direction, as seen in Fig. 5. By this time the toggle will have been straightened by the spring 196, and the bell crank 158 is moved by the bell crank 180, through the straightened toggle, in a clockwise direction to disengage the clutch and apply the brake. The brake will thereafter be held firmly applied and any further rotation of the shaft 82 will be positively prevented because the bell crank 180, being rigidly connected by the straightened toggle with the bell crank 158, which is now in its extreme brake-applying position, cannot swing in a clockwise direction to permit the projection 191 of the cam to move past the cam roll.

It should be noted that the toggle 154, 174 is straightened by the spring 196 soon after the initiation of an indexing cycle, and that the brake is applied to bring the indexing mechanism to rest, as previously explained, at the end of an indexing cycle, regardless of the length of time the operator presses the indexing switch and of the position of the tripping latch 150. However, the indexing mechanism cannot be operated to move another rocket carrying tube into launching position unless the operator first releases the indexing switch to allow the latch 150 to return to its normal position. For controlling the latch 150 the following mechanism is provided: The latch has connected thereto a rod 202 (Fig. 6) which extends through a pin 204 mounted in the lower ends of the bifurcated portion 178 of the bell crank 180, the rod having threaded on its outer end a nut 205. A compression spring 206 is mounted on the rod 202 between a shoulder on the rod and the pin 204. Normally, when the pilot releases the indexing switch immediately after energization of the solenoid 144, the latch 150 will be returned to its elevated position before the toggle 154, 174 has been straightened by the spring 196. However, if the pilot continues to press the indexing switch, the latch 150 will be held in its lowered position and, as the toggle is straightened, the projection 153 of the link 154 will cam the corner 207 of the latch 150 and cause the latch and the rod 202 to move to the right of Fig. 6, compressing the spring 206. In this position of the parts, the latch cannot trip the link 154 to start another indexing cycle. However, as soon as the pilot releases the indexing switch, the latch 150 will be moved upward, the spring 206 permitting the latch to yield sufficiently to permit the inclined face of the hook 152 of the latch to ride over the projection 153 of the link 154 until the shoulder on the latch snaps over the projection 153, so that the latch will again be in position to trip the link 154 to initiate an indexing cycle upon the next operation of the indexing switch.

Figure 14:
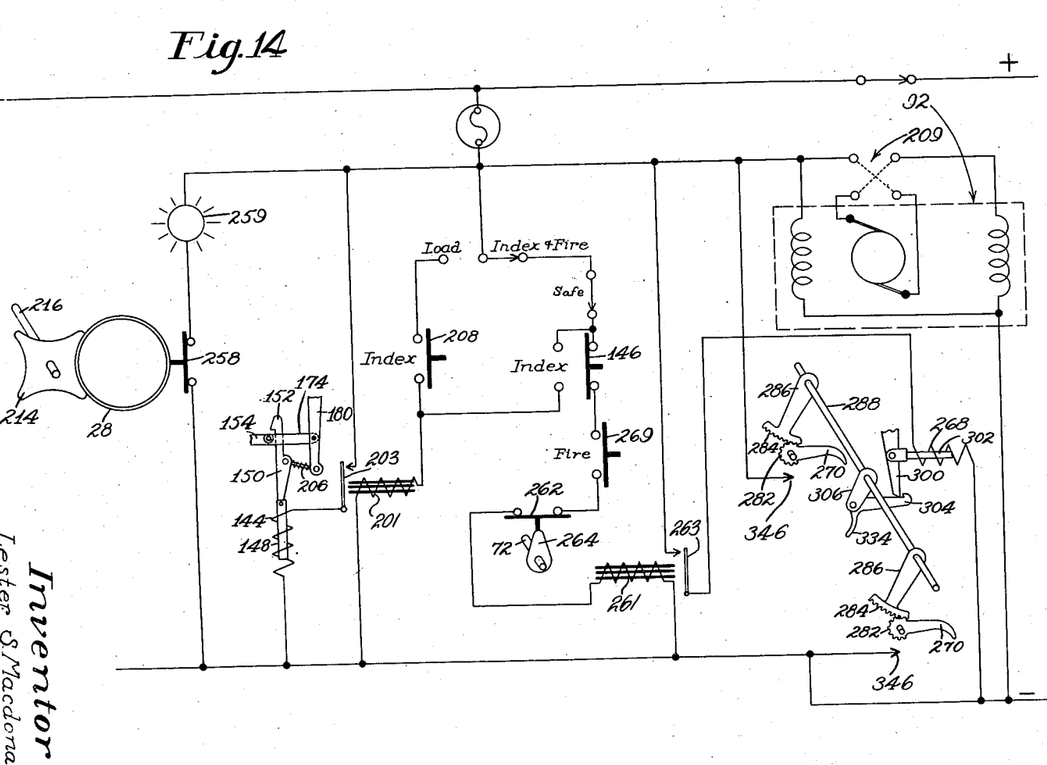
Fig. 14 is a wiring diagram.

As previously stated, the motor 92 is reversible and is operated in one direction to move the rocket carrying tubes downward into launching position and in the opposite direction to move the tubes upward, as when it is desired to replenish a partially loaded magazine from which some, but not all, the rockets have been fired. Initially the magazine is loaded by inserting a rocket carrying tube at the upper end of the magazine and closing a switch 208 (Fig. 14). Closing of this switch energizes a relay 201 and closes a switch 203 connected in the circuit controlling the solenoid 144, thereby closing the circuit to operate the indexing mechanism in the manner above described to move the tube down one position, after which another tube is inserted and the procedure repeated until the magazine is fully loaded, with the lowermost tube in the launching position. As each rocket is fired and its empty carrying tube ejected from the magazine, the tube next above it is indexed downward into launching position. If, after firing a number of rockets, it is desired to replenish the magazine, it is necessary first to move the rocket carrying tubes up until the uppermost tube is at the upper end of the magazine, since otherwise the remaining tubes would be ejected from the magazine by the successive operations of the indexing mechanism.

To reverse the operation of the indexing mechanism for replenishing the magazine, the motor switch is first turned off to shut off the power. With the motor at rest, the pilot presses a reversing switch 209 (Fig. 14) to reverse the motor. Thereafter, successive operation of the switch 208 will operate the indexing mechanism to move the tubes upward one at a time until the uppermost tube is at the extreme upper end of the magazine. The motor must then be again reversed and, upon operation of the switch 208, the indexing mechanism will be operated to move the tubes downward a distance equal to the spacing between the centers of two adjacent tubes. As the tubes are thus moved downward successively, a rocket carrying tube is inserted in the space next above the uppermost tube and the operation is repeated until the magazine is again full.

During the operation of the indexing mechanism to move the tubes upward, the clutch and brake control mechanism, above described, operates in the same manner as during the indexing of the tubes downward, the cam roll 188 (Figs. 5 and 6) engaging the depression 194 of the cam 190 at the end of an indexing cycle. To insure that the indexing mechanism will be stopped during the loading operation, after moving the tubes upward a distance equal to the spacing between the centers of two adjacent tubes, in the same manner as during operation of the indexing mechanism to move the tubes downward into rocket launching position, there is provided a lost motion connection comprising a recess 210 in the loosely mounted cam 190 and a projection 211 on a cam driver 212 fast on the shaft 82. With the parts in the position shown in Figs. 5 and 6, when the shaft 82 begins to rotate in a counterclockwise direction to move the tubes upward, the cam driver 212 will immediately rotate with the shaft, while the cam 190 will effect a lost motion until the projection 211 on the cam driver engages the right-hand extremity of the recess 210 in the cam, the angular extent of the lost motion being substantially equal to the angular distance between the centers of the depressions 192 and 194 in the cam.

As the rocket carrying tubes are moved successively downward, the lowermost tube is engaged and indexed into launching position by a pair of star wheels 214 (Figs. 1, 2, 3, 7 and 8) mounted on the opposite ends of a shaft 216 journaled in brackets 218 (Fig. 3) secured to the lower end portions of the magazine frame members 20 and 22. The shaft 216 is operatively connected to the conveyer mechanism by means comprising a worm gear 220 (Figs. 2 and 8) that is fast on one end of the shaft and meshes with a worm 222 on a shaft 224 journaled in a bearing block 226 integral with the bracket 74, the inner end of the shaft 224 having fast thereon a bevel pinion 228 which meshes with a bevel gear 230 on the sprocket shaft 72. As the shaft 72 is rotated by the sprocket chain 46, the rotation of the shaft is transmitted to the shaft 216 to rotate the star wheels 90° during each indexing cycle to cause them to move the tube supported by their upper tube-engaging faces into launching position. Upon initiation of a new indexing cycle, after the firing of the rocket from the tube located in the launching position, to move another rocket carrying tube into launching position, the star wheels are again rotated 90° to eject the empty tube through the open lower end of the magazine and to move the tube next above it into launching position.

Figure 7:
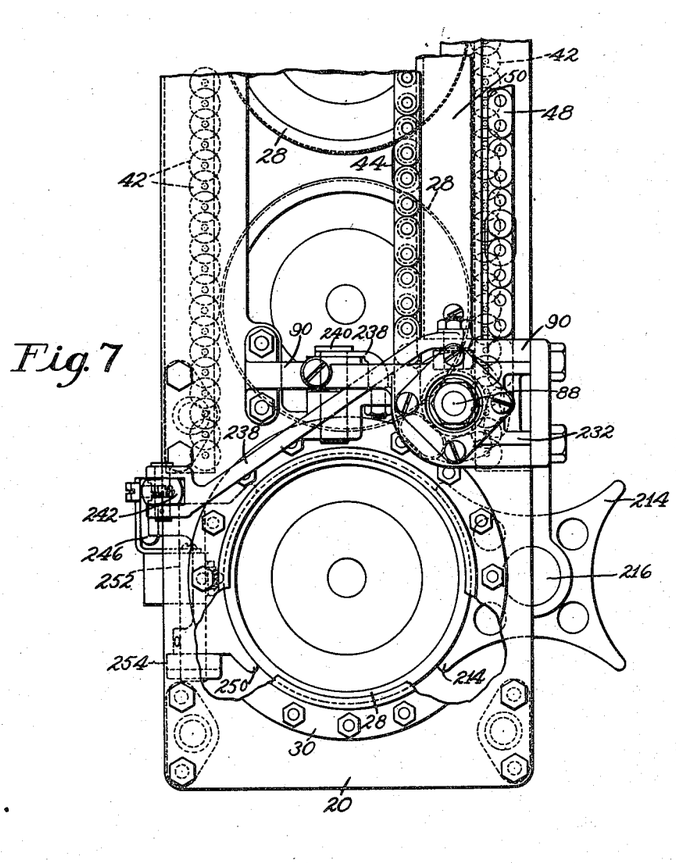
Fig. 7 is a front end view, taken along the line VII—VII of Fig. 1, of the lower portion of the apparatus, this view illustrating a rocket carrying tube centered in rocket launching position.
Figure 8:
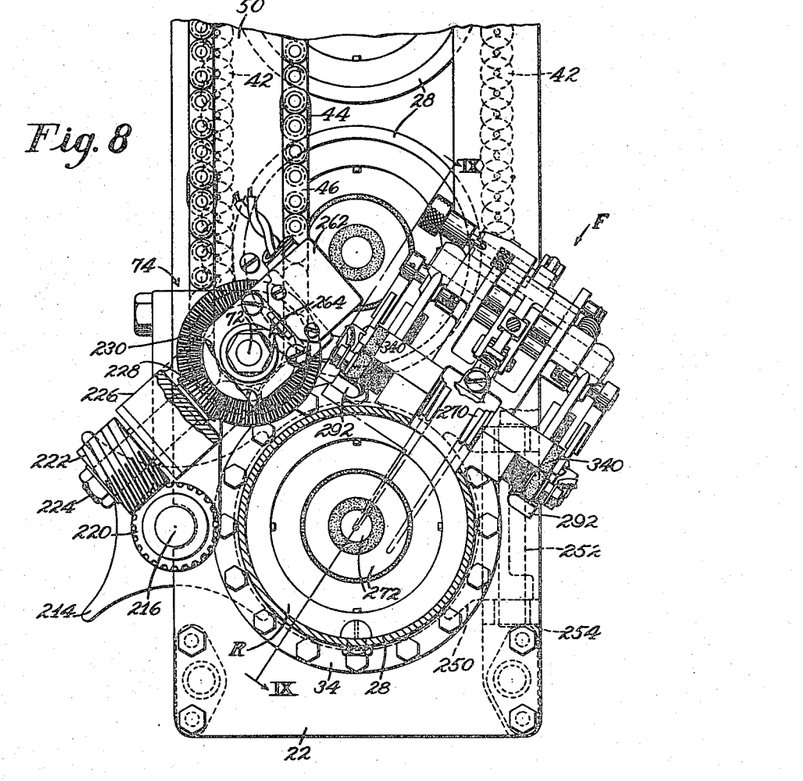
Fig. 8 is a rear end view of the lower portion of the apparatus, taken along the line VIII—VIII of Fig. 1, this view illustrating a rocket carrying tube centered in rocket launching position and a firing mechanism for firing the rocket in the tube.

To insure that each tube will be properly centered and held in register with the projection tube 32 and the exhaust tube 36, there is provided a centering mechanism which is operatively connected to the indexing mechanism and actuated thereby near the end of an indexing cycle to engage the rocket tube and cooperate with the star wheels 214 in centering and holding the tube in the launching position until after the rocket carried by that tube has been fired, and thereafter again actuated, at the beginning of the next cycle, to release the empty tube so it may be ejected from the magazine by the star wheels. Referring to Figs. 2, 3 and 7, the outer end of the sprocket shaft 88 has fixed thereto a cam 232 provided with a cam groove 234 which is engaged by a roll 236 mounted on one end of a two-arm lever 238 fulcrumed at 240 on the bracket 90. The opposite end of the lever 238 is pivotally connected by a link 242 to a bar 244 mounted for longitudinal reciprocating movement in guideways 246 secured to the lower end portions of the magazine frame members 20 and 22. As shown in Fig. 3, the bar 244 is made in two parts, which are joined together in threaded relation, a nut 247 being provided for varying the length of the bar. The bar 244 is provided at its opposite ends with rack teeth 248 which mesh with teeth 249 formed on the upper end portions of a pair of vertical centering members 250 which are mounted on pintles 252 journaled in brackets 254 secured to the inner surfaces of the lower end portions of the magazine frame members 20, 22. In timed relation to the rotation of the sprocket shaft 88 to move a rocket carrying tube into launching position, the cam 232 on the shaft acts through lever 238 and link 242 to move the rack bar 244 toward the right of Fig. 3, thereby causing the centering members 250 to be rotated 90° in a clockwise direction from their inoperative positions, indicated by the broken lines in Fig. 3, to their operative positions, indicated by the full lines in the same figure, until their concave edge faces 256 (Fig. 2) engage the outer surface of the rocket caryying tube. Since the centering members are positively located, the star wheels are mounted on the shaft 216 with a limited amount of play in order to permit their tube-engaging faces to adjust themselves to the curvature of the outer surface of the rocket carrying tube after the tube has been engaged by the centering members, thereby insuring perfect alinement between the axes of the rocket carrying tubes and of the projection tube to insure correct firing of the rockets through the projection tube.

As the indexing mechanism comes to rest at the end of an indexing cycle and a rocket carrying tube has been centered in launching position, the outer surface of the tube engages a microswitch 258 (Figs. 1, 2 and 3) carried by a bracket 260 escured to one of the brackets 254 and closes the microswitch to light a "tell-tale" lamp 259 (Fig. 14) in the pilot's compartment, thus indicating the presence of a rocket in position to be fired. At the same time a normally open microswitch 262 (Fig. 8), mounted on the bracket 74 and connected in the firing circuit, is closed by a cam 264 fixed to the outer end of the sprocket shaft 72. Closing of the microswitch 262 energizes a relay 261 (Fig. 14) and closes a switch 263 connected in the circuit controlling a solenoid 268 which operates a firing mechanism to be described presently. By the closing of this circuit the firing mechanism is put in readiness to be operated to fire a rocket when the pilot closes a firing switch 269. This arrangement insures that no rocket can be fired unless its carrying tube is correctly positioned in register with the projection and exhaust tubes.

Upon operation of the indexing switch by the pilot, after the firing of a rocket, to initiate a new indexing cycle, the rack bar 244 is moved to the left of Fig. 3, and the centering members 250 are rotated 90° in a counterclockwise direction to the broken line position shown in that figure, out of engagement with the empty tube, thus permitting the star wheels 214 to eject this tube and move another rocket carrying tube into launching position. At the same time the microswitch 262 is again opened thus opening the firing circuit to prevent the firing of the rocket carried by the tube being moved into launching position until that tube has been correctly located and centered in register with the projection tube in the manner explained above.

For firing the rockets there is provided a firing mechanism generally indicated at F in Figs. 1, 2, 8 and 9. The firing mechanism is mounted on a casting 266 supported on the exhaust tube flange 34. The casting supports the solenoid 268 which, when energized by the operation of the firing switch 269 (Fig. 14) located on the instrument panel, actuates, through the intermediary of means to be described, a pair of contact fingers 270 (Figs. 2, 8 and 9) causing them to engage a pair of contact members 272 (Fig. 8) on the rear end of each rocket. The contact members are connected by wires 274 (Fig. 9) to an electric squib 276 in the rear end of the rocket. Just prior to engaging the contact members 272, the contact fingers 270 are energized and, upon engaging the contact members 272, the squib 276 is ignited to set off the secondary charge in the rocket, which in turn sets off the propellent charge to fire the rocket.

Figures 9, 10:
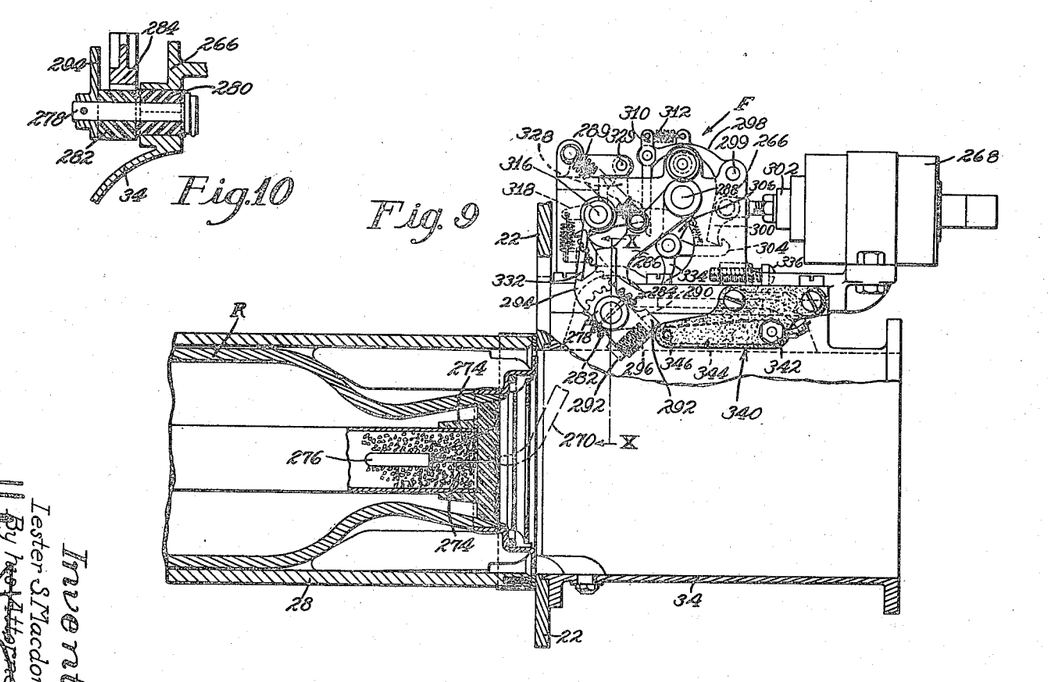
Fig. 9 is a view in side elevation of the firing mechanism along the line IX—IX of Fig. 8.
Fig. 10 is a sectional detail view of a portion of the firing mechanism taken along the line X—X of Fig. 9.

The fingers 270 are formed integral with shafts 278 (Figs. 2, 9 and 10) rotatably mounted in bushings 280 of an insulating material mounted on opposite sides of the casting 266. Rotatably mounted on the shafts 278 are gears 282 made of a non-conductive material and meshing with gear segments 284 formed on the lower ends of segment arms 286, likewise made of a non-conductive material and fast on the opposite ends of a rockshaft 288 mounted in bearings in the casting 266. Each segment arm 286 has secured thereto one end of a spring 289, the opposite end of which is secured to the casting 266. Each gear 282 has a projection 290 extending downward between inwardly turned ears 292 on a contact blade 294 pinned to the shaft 278. In the projection 290 of each gear 282 is formed a socket in which is mounted a compression spring 296 interposed between the closed end of the socket and the inner face of the lower end portion of the corresponding contact blade 294. Referring to Fig. 9, in which the parts are shown in inoperative position, when the shaft 288 is rocked in a counterclockwise direction by means shortly to be described, the segment arms 286 are rocked in the same direction and rotate the gears 282 in a clockwise direction and, through the pressure of the springs 296, cause the contact blades 294 and the shafts 278 to rotate in the same direction to move the contact fingers 270 into engagement with the contact members 272 on the rocket.

The means for rocking the shaft 288 and the segment arms 286 comprise a bell-crank lever 298 (Figs. 2 and 9) pivoted at 299 on the casting 266 and having a downwardly extending arm 300 that is connected to the plunger 302 of the solenoid 268. The lower end of the lever arm 300 is arranged to engage the hooked end of a latch 304 pivotally connected at its opposite end to the lower bifurcated end portion of a downwardly extending block 306 rigidly mounted on the shaft 288. The bell-crank lever 298 also has a horizontal arm 308 pivotally connected to the bifurcated upper end portion of a lever 310, a spring 312 being stretched between this bifurcated portion of the lever and a lug on the lever arm 308. The lower end portion of the lever 310 is provided with a shoulder which is normally engaged by one arm 314 of a three-arm lever rigidly mounted on a transverse rockshaft 316 mounted in bearings in the casting 266. A forwardly extending arm 318 of the three-arm lever has connected thereto one end of a spring 320, the other end of which is connected to a pin 322 on the casting 266. The three-arm lever also has an upwardly extending arm 324, the upper end of which is in engagement with the heel portion 326 of a tumbler 328 pivoted at 329 on the casting 266 and having a toe portion 330 in engagement with the lower end portion of the lever 310. Fast on the opposite ends of the shaft 316 are downwardly extending pawls 332 normally in engagement with shoulders on the contact blades 294.

When the solenoid 268 is energized by operation of the firing switch, the bell crank 298 is actuated by the solenoid plunger 302 first to swing in a clockwise direction, as seen in Fig. 2, and the lever 310 is moved downward to depress the arm 314 of the three-arm lever on the shaft 316, causing this lever and the shaft to rock in a counterclockwise direction to disengage the pawls 332 from the contact blades 294. The bell crank 298 thereafter actuates the latch 304 to rock the shaft 288 and the segment arms 286 in a clockwise direction, to cause the contact fingers 270 to be rotated in a counterclockwise direction to engage the contact members 272 on the rocket.

As shown in Fig. 9, a small amount of space is provided between the lower end of the lever arm 300 and the hooked end of the latch 304 to provide lost motion of the bell crank 298 in order to compensate for the interval between the release of the pawls 332 and the actuation of the latch 304. As the arm 314 of the three-arm lever is depressed and the lever rocks counterclockwise, its arm 324 actuates the tumbler 328 to swing in a clockwise direction, as seen in Fig. 2, and to cause the lever 310 to swing in the same direction out of engagement with the arm 314 of the three-arm lever. When the lever arm 300 begins to pull the latch 304 to the left of Fig. 2, the shaft 288 and the segment arms 286 are rocked in a clockwise direction to rotate the contact fingers 270 in the counterclockwise direction into engagement with the contact members 272 on the rocket. The latch 304 continues to move until a downwardly projecting lug 334 on the latch engages an adjustable stop screw 336 mounted in the casting 266, whereupon the latch swings in a counterclockwise direction about its pivotal connection with the block 306, out of engagement with the lever arm 300. The latch is returned to its normal position by a spring 338 attached at one end to the latch and at its opposite end to the block 306.

Secured to the opposite sides of the casting 266 are plates 340 (Figs. 1, 8 and 9) made of a non-conductive material. Each plate 340 has fastened to its inner face by a screw 342 one end of a leaf spring 344, the opposite end of which carries a contact 346 extending through the plate. Electric wires 348 connected to the screws 342 carry current from a suitable source of power (not shown) to the springs 344 and the contacts 346. Near the end of the clockwise rotation of the contact blades 294, as seen in Fig. 9, to move the fingers 270 into operative position, the contact blades engage the contacts 346 and energize the fingers to fire the rocket in the manner described above. The fingers 270 engage the contact members 272 on the rocket yieldingly, due to the springs 296 which permit them to adjust themselves individually to any possible variations in the spacing of the contact members 272. Immediately after engaging the contact members on the rocket, the fingers 270 are retracted into a recess in the exhaust tube flange 34 by the springs 289 which actuate the segment arms 286, and at the same time the pawls 332 engage the shoulders on the contact blades 294, thereby locking the contact blades against further rotation in a clockwise direction and insuring that the fingers 270 will be held out of the blast from the rocket.

Figure 11:
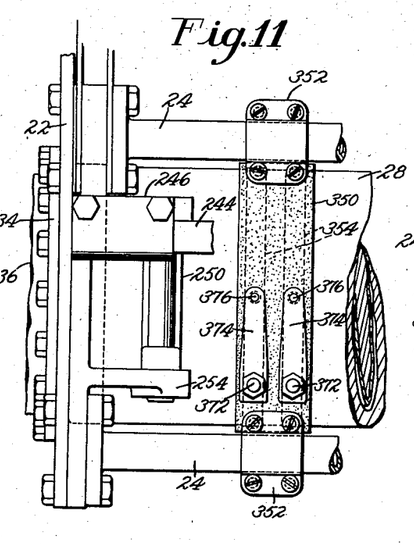
Figs. 11, 12 and 13 illustrate a modified form of firing means.
Figure 12:
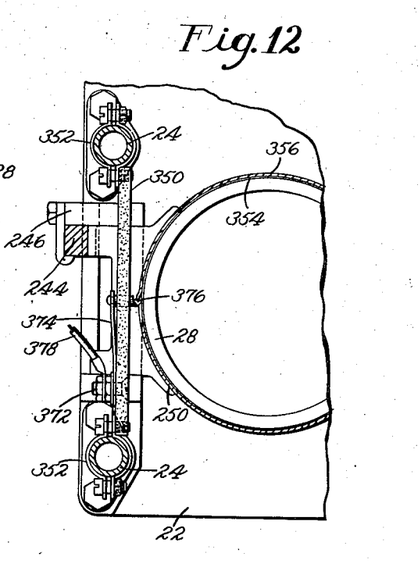
Figure 13:
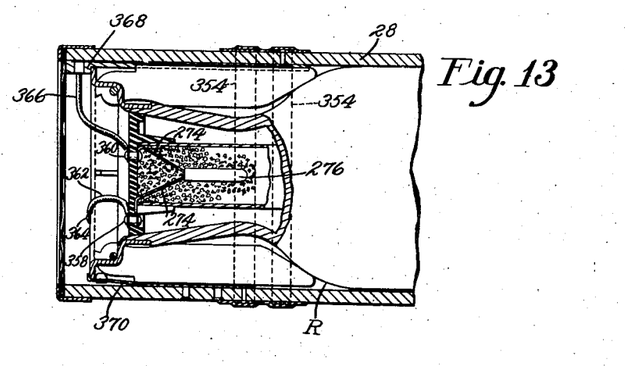

An alternative arrangement is provided, in accordance with the invention, which may be used in place of the firing mechanism previously described for firing the rockets successively. Referring to Figs. 11, 12 and 13, a plate 350 of insulating material is secured by means of clamps 352 to the lowermost pair of spacer rods 24. Each rocket carrying tube 28 is provided with two spaced contact bands 354 mounted on the end of the tube nearest the firing end of the magazine. Each contact band 354 is covered with a layer 356 of protective material such as cellophane or the like. The leads 274 from the squib 276 are attached to the inner ends of a pair of rivets 358, 360 on the rear end of the rocket. To the outer end of the rivet 358 is connected a ground wire 362, which is also connected to a rivet 364 on the rocket flange. To the outer end of the rivet 360 is connected a wire 366, which is also connected to a metal strip 368 riveted to the inner wall of each rocket tube 28 and to one of the contact bands 354. The strip 368 is insulated from the rocket by a layer of suitable insulating material. Riveted to the opposite inner wall of the rocket tube and to the other contact band 354 is a metal strip 370 which serves as the ground conductor. To the insulating plate 350 are fixed, as by screws 372, two spaced leaf springs 374, which are provided at their upper ends with contact elements 376 that project through the plate 350 and into the path of the rocket carrying tubes as the tubes are successively moved into rocket launching position. To the terminals 372 are connected wires 378, one of which is connected to the microswitch 262 (Fig. 8) and the other to the firing switch 269 (Fig. 14) on the instrument panel.

The above-described mechanism operates as follows: Assuming a rocket carrying tube 28 to have been located and centered in launching position by the star wheels 214 and the centering members 250 (Fig. 3), as previously explained, engagement of the tube 28 with the microswitch 258 will have lighted the "tell-tale" lamp 259 (Fig. 14) in the pilot's compartment to indicate the presence of a rocket in position to be fired, and the microswitch 262 (Fig. 8) will have been closed to complete the firing circuit. As the tube 28 arrives in rocket launching position, the contact elements 376 (Fig. 12) pierce through the protective layer 356 and engage the contact bands 354 on the tube. As soon as the pilot operates the firing switch, electric current is caused to pass through the contact bands to ignite the squib 276 and set off the secondary charge in the rear end of the rocket, which, in turn, sets off the propellant charge to launch the rocket.

Having thus described my invention, what I claim as new and desire to secure by Letters Patent of the United States is:

1. An apparatus for launching projectiles having, in combination with a magazine supporting a plurality of projectile carrying tubes, a projection tube and an exhaust tube both connected to said magazine, remotely controlled indexing means for intermittently moving said projectile carrying tubes from a loading position in the magazine to a firing position in register with said projection tube, centering means, including tube locking members, operatively connected to said indexing means and actuated in timed relation to the operation thereof to position and hold each projectile carrying tube in alinement with said projection tube and exhaust tubes, separately controlled firing means for firing each projectile, and connections between said firing means and said indexing means arranged to render the firing means operable to fire a rocket only after its carrying tube has been correctly positioned by the centering means.

2. An apparatus for launching projectiles comprising, in combination, a magazine, a plurality of projectile carrying tubes, a projection tube and an exhaust tube both connected to said magazine, remotely controlled indexing means for intermittently rotating said projectile carrying tubes into a firing position in register with the projection and exhaust tubes, centering means operatively connected to said indexing means and engaging the opposite ends of each projectile carrying tube to locate and hold it in alinement with the projection and exhaust tubes, remote, operator-controlled firing means operable to fire each projectile after its carrying tube has been correctly positioned by said centering means, said centering means being constructed and arranged to move independently of each other to accommodate themselves to the periphery of each projectile carrying tube.

3. An apparatus for launching projectiles comprising, in combination, a magazine, a plurality of projectile carrying tubes, a projection tube connected to said magazine, remotely controlled indexing means operated intermittently to move one of said projectile carrying tubes from a loading position in the magazine to a firing position in register with said projection tube, and thereafter to eject from the magazine the tube whose projectile has been discharged and to move the next projectile carrying tube into firing position, centering means operatively connected to said indexing means, driving means for operating said indexing means, and means actuated by said driving means to move said centering means successively into engagement with a projectile carrying tube at the end of one operating cycle of the driving means and out of engagement with said tube at the beginning of a succeeding operating cycle of said driving means.

4. An apparatus as defined in claim 3, in which the means acting to move the tube centering means into and out of engagement with a projectile carrying tube comprise a cam associated with the driving means, a reciprocating member coacting with said centering means, a lever connecting said reciprocating member to said cam, a roll carried by said lever and cooperating with said cam, said reciprocating member being operated by the cam at the end of an operating cycle of the driving means to move in one direction to move the centering means into tube engaging and centering position, and again operated at the beginning of a succeeding operating cycle of the driving means to move in the opposite direction to move the centering means out of engagement with the tube to permit the tube to be ejected from the magazine after the firing of the projectile.

5. An apparatus for launching projectiles comprising, in combination, a magazine, a plurality of projectile carrying tubes, a projection tube connected to said magazine, indexing means for intermittently moving said projectile carrying tubes from a loading position in the magazine to a firing position in register with said projection tube or vice versa, centering means operatively connected to said indexing means, driving means for operating said tube indexing and tube centering means, starting and stopping means acting automatically at the end of an operating cycle of the driving means to cause the driving means to come to a stop after operating the indexing means to move the projectile carrying tubes a predetermined distance in either direction, and a lost motion connection in said starting and stopping means for insuring that the tubes will be stopped in the same relative positions when moved to loading position as when they are moved to firing position.

6. An apparatus for launching projectiles comprising, in combination, a magazine, a plurality of projectile carrying tubes, a projection tube and an exhaust tube both connected to said magazine, indexing means for intermittently moving said projectile carrying tubes from a loading position in the magazine to a firing position in register with said projection and exhaust tubes and for ejecting them from the magazine, centering means coacting with said indexing means to locate and hold each projectile carrying tube in said firing position, driving means for operating said tube indexing and tube centering means, remote control electric means for firing the projectiles successively through said projection tube, and means operated in timed relation to the operation of said tube indexing and centering means to prevent operation of said firing means until the completion of an operating cycle of said driving means, thereby preventing operation of the firing of means to fire a projectile until its carrying tube has been located and centered in the firing position.

7. An apparatus as defined in claim 6, in which the means for controlling the operation of the firing means comprises a firing circuit, a switch controlling said circuit, a member associated with the tube indexing means and actuated successively to engage said switch at the end of one operating cycle of the driving means, to close the firing circuit, and to be disengaged from said switch, at the beginning of a succeeding operating cycle of the driving means, to open the firing circuit, thereby preventing operation of the firing means to fire a projectile except when a projectile carrying tube is in proper firing position relative to the projection and exhaust tubes.

8. An apparatus for launching projectiles comprising, in combination, a magazine, a plurality of projectile carrying tubes, a projection tube connected to said magazine, means for intermittently moving said projectile carrying tubes to a firing position in register with said projection tube, spaced contact elements on the magazine constituting the terminals of an electric circuit, remote control means for energizing said contact elements, and means connecting the contact elements to a projectile and operative, upon energization of the contact elements, to ignite the firing charge in the projectile.

9. An apparatus for launching projectiles comprising, in combination, a magazine, a plurality of projectile carrying tubes, a projection tube and an exhaust tube both connected to said magazine, indexing means for intermittently moving said projectile carrying tubes to a firing position in register with said projection and exhaust tubes, centering means operatively connected to said indexing means and coacting therewith to center said projectile carrying tubes successively relatively to said projection and exhaust tubes, spaced contact elements on the magazine constituting the terminals of an electric circuit, remote control means effective only after the said centering means have correctly positioned each projectile carrying tube in register with the projection and exhaust tubes to energize said contact elements, and means movable, upon operation of said remote control means, to engage the projectile and cause the firing charge in the projectile to be ignited.

10. An apparatus for launching projectiles comprising, in combination, a magazine, a plurality of projectile carrying tubes, a projection tube and an exhaust tube both connected to said magazine, means for intermittently moving said projectile carrying tubes to a firing position in register with said projection and exhaust tubes, means for centering and locking each projectile carrying tube in said firing position, remote control means operable to fire a projectile only after its carrying tube has been correctly positioned and locked by said centering means, spaced conductors on the magazine, spaced contact bands on each projectile carrying tube, means electrically connecting said contact bands on each tube with the projectile carried thereby, and members carried by said conductors and adapted to engage said contact bands on each projectile carrying tube as the tube is located in the firing position by the centering means, said members being operative, upon operation of said remote control firing means, to ignite the firing charge in the projectile.

LESTER S. MACDONALD.

(References on following page)

REFERENCES CITED

The following references are of record in the file of this patent:

UNITED STATES PATENTS

| Number | Name | Date |
|---|---|---|
| 509,091 | McCullough | Nov. 21, 1893 |
| 672,300 | Turnbull | Apr. 16, 1901 |
| 1,108,716 | Davis | Aug. 25, 1914 |
| 1,273,078 | McManus | July 16, 1918 |
| 1,504,393 | Sutton et al. | Aug. 12, 1924 |
| 2,057,169 | Swenson | Oct. 13, 1936 |
| 2,359,517 | Gebeau | Oct. 3, 1944 |
| 2,380,024 | Chandler | July 10, 1945 |